Feb. 9, 1926.　　　　　　　　　　　　　　　　　　　　1,572,481
H. K. HITCHCOCK
GATE FOR GLASS TANKS
Filed Feb. 16, 1924　　　　2 Sheets-Sheet 2
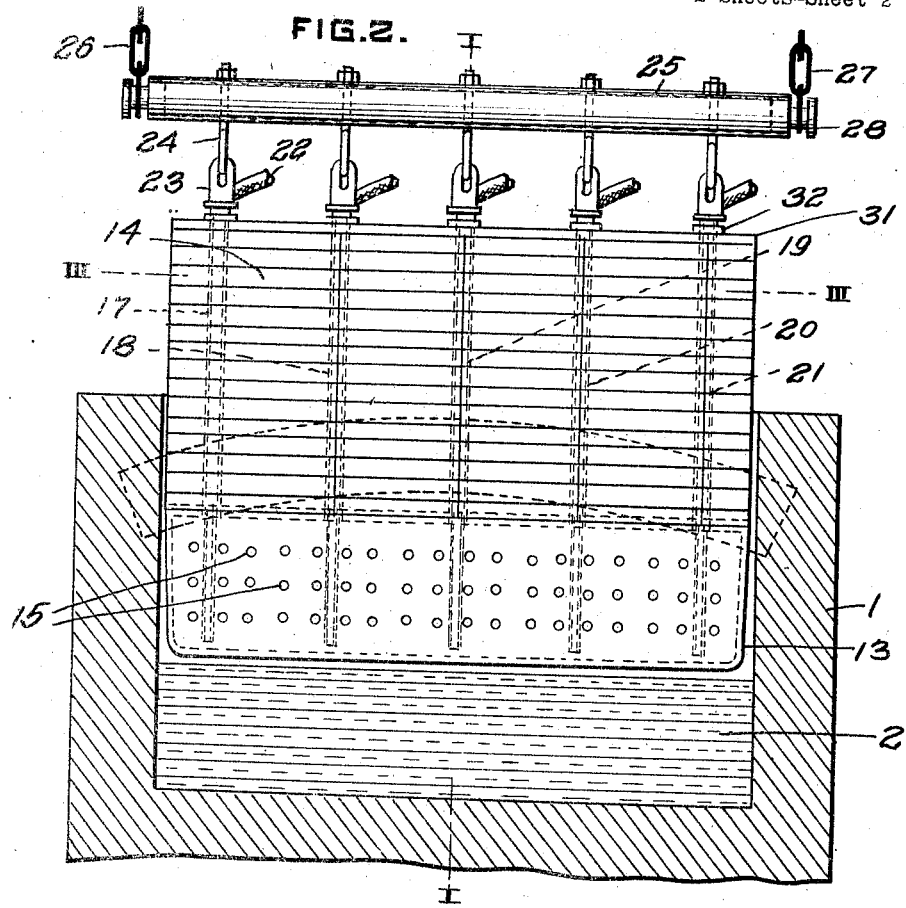
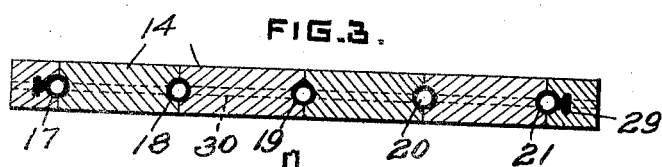
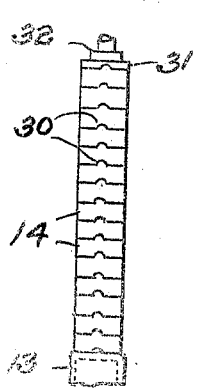
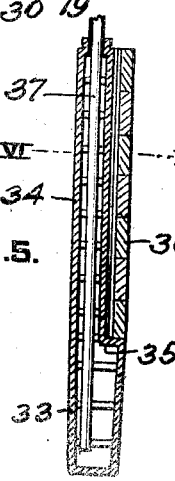
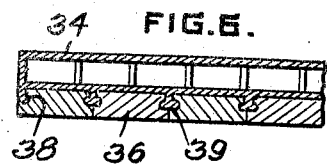
INVENTOR
H. K. Hitchcock
by
James C. Bradley
atty Patented Feb. 9, 1926.

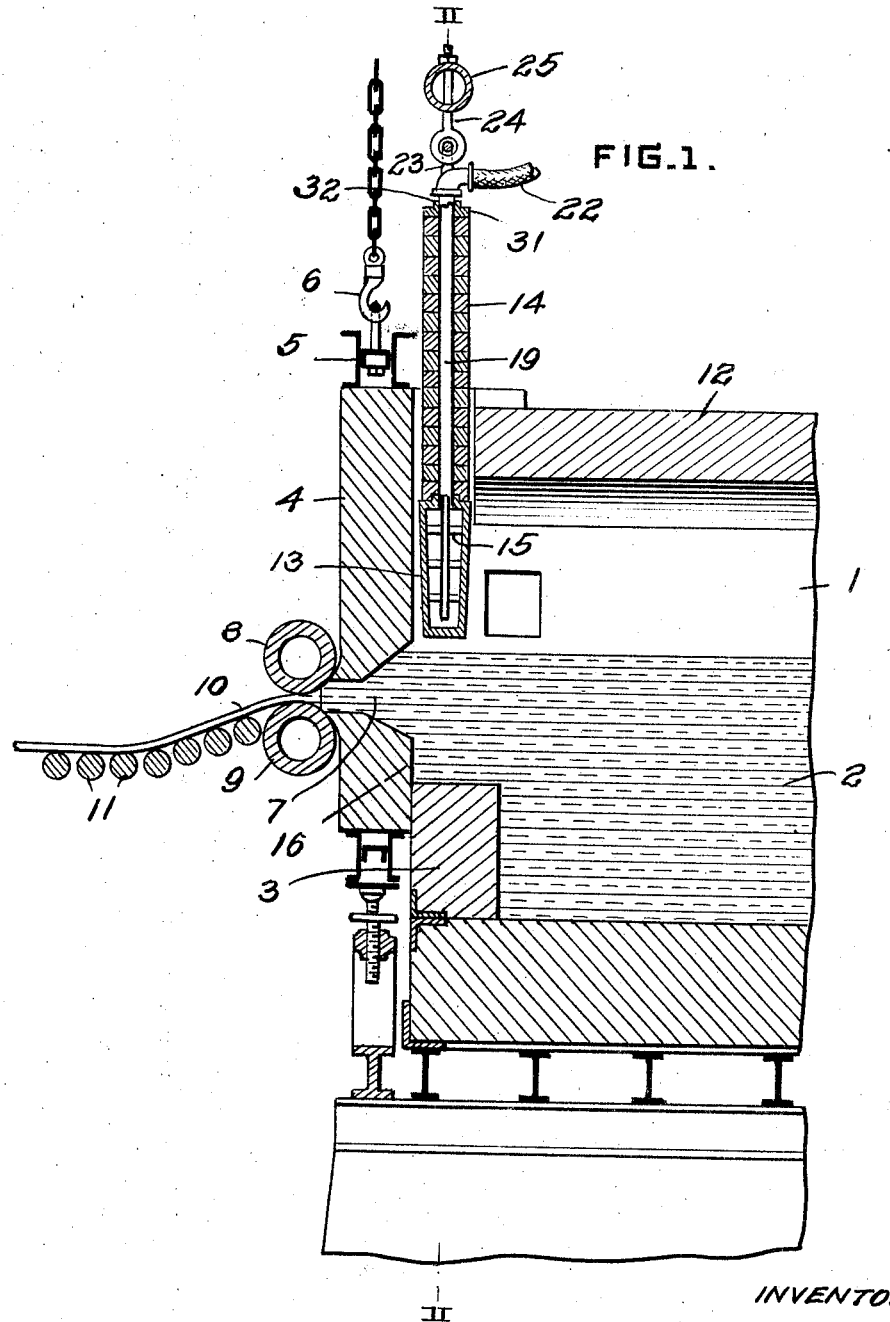

1,572,481

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

GATE FOR GLASS TANKS.

Application filed February 16, 1924. Serial No. 693,248.

*To all whom it may concern:*

Be it known that I, HALBERT K. HITCHCOCK, a citizen of the United States, and a resident of Pittsburgh, in the county of Allegheny and State of Pennsylvania, have made a new and useful invention in Improvements in a Gate for Glass Tanks, of which the following is a specification.

The invention relates to a water cooled gate for shutting off the flow of glass from a glass tank, such as is used for the continuous formation of a ribbon of glass. It has for its principal objects: the provision of an improved form of gate, (1) which will last indefinitely, and which will not contaminate the glass, such as is the case with the clay gates as heretofore used and which often become broken in the course of use and portions thereof fall into the glass; (2) which will have a minimum chilling effect on the body of glass back of the gate; and (3) in which the metal portion of the gate lying above the glass will be well protected from the heat of the furnace to the rear of the gate. Certain embodiments of the invention are illustrated in the accompanying drawings wherein:

Figure 1 is a vertical section through the forward end of a melting tank on the line I—I of Fig. 2. Fig. 2 is a transverse section on the line II—II of Fig. 1. Fig. 3 is a section on the line III—III of Fig. 2. Fig. 4 is a partial end view of the gate. And Figs. 5 and 6 are detail sections illustrating a modified form of gate, Fig. 5 being a vertical section through the gate and Fig. 6 being a partial transverse section on the line VI—VI of Fig. 5.

Referring to the arrangement of Figs. 1, 2 and 3, 1 is the forward end of the melting tank, which is preferably of the regenerative type and carries a bath of molten glass 2. The front wall of the tank consists of the lower fixed portion 3 and an upper movable portion 4 of clay surrounded by a supporting framework 5 of channel irons. The framework 5 carries an eye 6 by means of which the part 4 is supported above, and by means of which, it may be removed and replaced by the use of an overhead crane. This part 4 is clamped up tightly against the front of the tank by means of securing straps and bolts, not shown. The wall is provided with an outlet slot 7, opposite which is a pair of water cooled driven rolls 8 and 9 for giving the continuous ribbon, which is produced, a uniform thickness. The ribbon of glass 10 which is produced passes over a series of cooled rollers 11 and into a leer where the glass is annealed. The upper wall or crown 12 of the furnace is provided with a transverse slot in which is mounted the gate or "shear cake" to which the present invention particularly relates.

This gate consists of a lower water cooled part 13 and an upper part made up of refractory material such as the bricks 14. The part 13 is preferably made of heat resisting metal such as nichrome, the sides of which are supported by the stay bolts 15. The sides of the part 13 taper from the upper side of the part or member downward as illustrated in Figs. 1 and 2 in order to facilitate the lifting of the gate after it has been seated in the glass. When in lowered position, the bottom of the member 13 rests upon the top of the wall section 3, while the lower front portion of the member rests against the shoulder 16 of the movable wall part 4. The gate is supported by means of the pipes 17, 18, 19, 20 and 21, which also act as conduits for the water employed in cooling the gate. The pipes 17, 19 and 21 extend down relatively close to the bottom of the member 13 as indicated in Fig. 2, and constitute the inlets for the water, while the pipes 18 and 20 terminate at the top of the member 13 and act as the outlets, water being conducted to and from the various pipes by means of the flexible connections 22. The pipes are provided at their upper ends with the eye members 23 which are engaged by the bolts 24 and these bolts extend through the bridge 25, preferably made in the form of a pipe. The bolts are threaded and provided with nuts as indicated, and the bridge is supported from the chains 26 and 27 whose lower ends are attached to plug members 28 carried by the ends of the bridge.

The outer pipes 17 and 21 are provided with tongues 29 (Fig. 3) projecting from their outer sides, and the outer rows of bricks are suitably grooved to fit over these tongues so that such bricks are securely held in position. The four rows of bricks intermediate the outer pipes 17 and 21 are grooved at their edges, as indicated in Fig.

3, so that they fit around the pipes and are also securely held in position. The bricks are also provided with tongues 30 extending longitudinally of their upper faces, as indicated in Fig. 4, and also with corresponding grooves on their lower sides so that the bricks interlock, still further adding to the security of the structure. A metal plate 31 extends longitudinally of the gate in engagement with the top row of bricks and this plate is clamped down in position by means of nuts 32 so that the brick work is clamped between the plate and the water cooled member 13.

When it is desired to shut off the flow of glass through the slot 7, the gate is lowered from the position illustrated so that its lower face comes into contact with the top of the section 3, or closely adjacent thereto, thus stopping the flow of glass. At this time, the upper edge of the member 13 comes at or closely adjacent to the surface of the glass bath 2. The temperature of the member 13 is such that the glass in contact with it is solidified, and as glass is a relatively poor conductor, this socket of chilled glass protects the member 13 from the relatively high temperature of the molten glass and prevents any great amount of chilling of the molten bath. The chilling of the thin layer of glass between the member 13 and the clay parts 3 and 16 and also between the end walls of the member 13 and the side walls of the furnace closes the spaces between these parts, so that a tight seal is secured and no leakage of glass occurs past the gate after it is once seated in position. When it is desired to lift the gate, this is easily accomplished as the glass does not adhere to the water cooled member 13 and it is free to be moved upward because of its tapering shape.

The brick work 14 protects the pipes 17 to 21 from the action of the heat of the furnace above the surface of the glass and prevents this part of the gate from unduly chilling the glass back of the gate, such as would be the case if the brick work were not employed or if the member 13, instead of terminating at the surface of the glass, extended upwardly to the crown of the furnace. In the latter case, the upper portion of the gate above the surface of the glass is subjected to a degree of heat tending to produce strain and fracture, while the present structure entirely avoids difficulties of this character.

Figs. 5 and 6 show an alternative gate structure for securing the same advantages as those secured by the construction of Figs. 1 to 3. In this form of gate, the water cooled shear cake comprises a lower portion 33 and an upper portion 34 with a shoulder 35 at the juncture of the two parts, which shoulder acts as a support for the protecting brick work 36. The gate is supported and water cooled in the same manner as the construction of Figs. 1 to 3, namely, by the use of the pipes 37 which act as conduits for the cooling fluid. In order to hold the bricks 36 in position, the wall of the part 35 is provided with the tongues 38 and 39 as indicated in Fig. 6, and the bricks are correspondingly grooved to engage these tongues, the bricks being assembled by slipping them over the tongues at the top of the member 34 and sliding them down until they arrive at their proper positions. In use, this form of gate is submerged to a point such that the shoulder 35 lies at, or very close to, the surface of the glass. The brick work 36 protects the part 34 of the gate from the intense heat of the furnace above the surface of the glass and serves to prevent the gate from unduly chilling the surface of the glass lying to the rear of the gate, such as would be the case if the brick work 36 were not employed.

What I claim is:

1. The combination with a melting tank having an outlet at its forward end, of a gate mounted for vertical movement through the top of the tank, and adapted when lowered to cut off the flow of glass to said outlet, said gate comprising a lower water cooled portion and a portion of refractory material lying thereabove.

2. The combination with a melting tank having an outlet at its forward end, of a gate mounted for vertical movement through the top of the tank, and adapted when lowered to cut off the flow of glass to said outlet, said gate comprising a lower water cooled portion adapted to be submerged in the glass when the gate is lowered to cut off position, and a refractory portion lying above the surface of the glass when the gate is in such position.

3. The combination with a melting tank having an outlet at its forward end, of a gate mounted for vertical movement through the top of the tank, and adapted when lowered to cut off the flow of glass to said outlet, said gate comprising a lower water cooled portion adapted to be submerged in the glass when the gate is lowered to cut off position, water cooled supporting means extending upward from said lower portion, and refractory protecting means for said water cooled means also extending upward from said lower portion to the top of the tank when the gate is in such lowered position.

4. The combination with a melting tank having an outlet at its forward end, of a gate mounted for vertical movement through the top of the tank, and adapted when lowered to cut off the flow of glass to said outlet, said gate comprising a lower water cooled portion, metal supporting means extending upward from said lower portion, and refractory protecting means surrounding said supporting means and extending upward from said lower portion.

5. The combination with a melting tank having an outlet at its forward end, of a gate mounted for vertical movement through the top of the tank, and adapted when lowered to cut off the flow of glass to said outlet, said gate comprising a lower water cooled portion, hollow metal supporting means extending upward from said lower portion and acting as conduits for circulating water to and from said lower portion, and refractory protecting means surrounding said supporting means and extending upward from said lower portion.

6. The combination with a melting tank having an outlet at its forward end, of a gate mounted for vertical movement through the top of the tank, and adapted when lowered to cut off the flow of glass to said outlet, said gate comprising a lower water cooled portion lying, when in lowered position, with its upper edge at the level of the glass, a plurality of supporting pipes extending upward from said lower portion to a point outside the furnace, and adapted to act as conduits for circulating water to and from said lower portion, and refractory means surrounding the pipes and constituting the upper portion of the gate.

7. The combination with a melting tank having an outlet at its forward end, of a gate mounted for vertical movement through the top of the tank, and adapted when lowered to cut off the flow of glass to said outlet, said gate comprising a lower water cooled portion lying, when in lowered position, with its upper edge at the level of the glass, a plurality of supporting pipes extending upward from said lower portion to a point outside the furnace, and adapted to act as conduits for circulating water to and from said lower portion, and an upper gate portion of brick work supported on said lower portion and surrounding said pipes.

In testimony whereof, I have hereunto subscribed my name this 14th day of February, 1924.

HALBERT K. HITCHCOCK.